(12) United States Patent
Nakayama et al.

(10) Patent No.: US 10,744,656 B2
(45) Date of Patent: Aug. 18, 2020

(54) LINE-SHAPED-ITEM SECURING METHOD

(71) Applicant: FANUC CORPORATION, Yamanashi (JP)

(72) Inventors: Kazutaka Nakayama, Yamanashi (JP);
Yasuyoshi Tanaka, Yamanashi (JP);
Satoshi Adachi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 156 days.

(21) Appl. No.: 16/181,600

(22) Filed: Nov. 6, 2018

(65) Prior Publication Data

US 2019/0160695 A1    May 30, 2019

(30) Foreign Application Priority Data

Nov. 30, 2017  (JP) ................. 2017-229854

(51) Int. Cl.
*B25J 19/00*    (2006.01)
(52) U.S. Cl.
CPC ....... *B25J 19/0029* (2013.01); *B25J 19/0025* (2013.01); *Y10S 901/50* (2013.01)
(58) Field of Classification Search
CPC ...... B25J 19/00; B25J 19/002; B25J 19/0025; B25J 19/0029
See application file for complete search history.

(56) References Cited

U.S. PATENT DOCUMENTS

2014/0047940 A1* 2/2014 Yamamoto ............. B25J 19/007
74/490.05
2015/0040713 A1* 2/2015 Hirano ................. B25J 19/0029
74/490.02
2016/0067870 A1* 3/2016 Kono .................... F16L 3/1222
248/52

FOREIGN PATENT DOCUMENTS

| EP | 2835226 A1 | 2/2015 |
|----|-----------|--------|
| JP | S51-049827 U | 4/1976 |
| JP | S53-19800 U | 2/1978 |
| JP | S54-031595 A | 3/1979 |
| JP | S55-020264 U | 2/1980 |
| JP | S55-047720 U | 3/1980 |

(Continued)

OTHER PUBLICATIONS

Office Action dated Oct. 29, 2019, in corresponding Japanese Application No. 2017-229854; 9 pages.

(Continued)

*Primary Examiner* — Jacob T Minskey
*Assistant Examiner* — Matthew Hoover
(74) *Attorney, Agent, or Firm* — Maier & Maier, PLLC

(57) ABSTRACT

Provided is a line-shaped-item securing method including an elastic-body disposing step of disposing an elastic body so as to surround the periphery of one or more line-shaped items; a compressing step of compressing the elastic body, disposed around the periphery of the line-shaped items in the elastic-body disposing step, in a direction perpendicular to the lengthwise direction of the line-shaped items to dimensions smaller than a gap in a robot, through which the line-shaped items are to be passed; a line-shaped-item inserting step of inserting a portion of the line-shaped items, surrounded by the elastic body compressed in the compressing step, into the gap; and an expanding step of releasing the elastic body from compression, with the line-shaped items inserted into the gap in the line-shaped-item inserting step, thereby expanding the elastic body.

10 Claims, 11 Drawing Sheets

(56) References Cited

FOREIGN PATENT DOCUMENTS

| | | |
|---|---|---|
| JP | S55-095446 U | 7/1980 |
| JP | S59-004685 U | 1/1984 |
| JP | S59-069892 U | 5/1984 |
| JP | S63-131389 U | 8/1988 |
| JP | H07-039046 A | 2/1995 |
| JP | 2003-266344 A | 9/2003 |
| JP | 2013-094939 A | 5/2013 |
| JP | 2014-037044 A | 2/2014 |
| JP | 2015-33749 A | 2/2015 |
| JP | 2016-55356 A | 4/2016 |
| KR | 10-2007-0071962 A | 7/2007 |
| WO | 2004/110704 A1 | 12/2004 |

OTHER PUBLICATIONS

Search Report dated Oct. 23, 2019, in corresponding Japanese Application No. 2017-229854; 22 pages.
Japanese Office Action dated Mar. 3, 2020, in connection with corresponding JP Application No. 2017-229854 (11 pgs., including machine-generated English translation).

* cited by examiner

US 10,744,656 B2

LINE-SHAPED-ITEM SECURING METHOD

CROSS-REFERENCE TO RELATED APPLICATIONS

This application is based on Japanese Patent Application No. 2017-229854, the content of which is incorporated herein by reference.

FIELD

The present invention relates to line-shaped-item securing methods.

BACKGROUND

As a device for securing various kinds of line-shaped items to an industrial robot, such as motor cables or tool driving cables to be attached to a wrist of the robot, there is a known type of securing device including a base member that is attached to the industrial robot; an elastic body that is disposed so as to surround the periphery of a line-shaped-item bundle; and a clamp member that is secured to the base member by using a fastening tool, such as bolts, so as to compress the elastic body and to press the line-shaped-item bundle via the compressed elastic body (e.g., see Japanese Unexamined Patent Application, Publication No. 2016-55356).

The arm and turnable body of an industrial robot are constituted of cast parts, and the inner surfaces of the arm and the turnable body in particular constitute untreated, rough casting surfaces. Thus, in the case where line-shaped items are wired inside the arm or the turnable body, it is necessary to prevent friction of the line-shaped items on the inner surface.

SUMMARY

The present invention provides the following solutions.

The present invention, in one aspect thereof, provides a line-shaped-item securing method including an elastic-body disposing step of disposing an elastic body so as to surround the periphery of one or more line-shaped items; a compressing step of compressing the elastic body, disposed around the periphery of the line-shaped items in the elastic-body disposing step, in a direction perpendicular to the lengthwise direction of the line-shaped items to dimensions smaller than a gap in a robot, through which the line-shaped items are to be passed; a line-shaped-item inserting step of inserting a portion of the line-shaped items, surrounded by the elastic body compressed in the compressing step, into the gap; and an expanding step of releasing the elastic body from compression, with the line-shaped items inserted into the gap in the line-shaped-item inserting step, thereby expanding the elastic body.

DETAILED DESCRIPTION

A line-shaped-item securing method according to an embodiment of the present invention will be described below with reference to the drawings.

Figure 1:
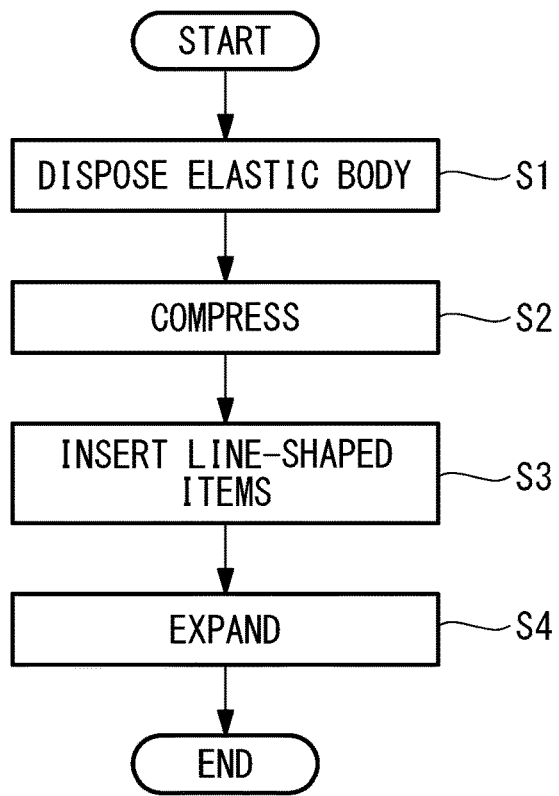
FIG. 1 is a flowchart for explaining a line-shaped-item securing method according to an embodiment of the present invention.

As shown in FIG. 1, the line-shaped-item securing method according to this embodiment includes an elastic-body disposing step S1 of disposing an elastic body 2 around the periphery of line-shaped items 1 at a portion of the line-shaped items 1 along the lengthwise direction thereof; a compressing step S2 of compressing the elastic body 2 disposed in the elastic-body disposing step S1; a line-shaped-item inserting step S3 of inserting the line-shaped items 1 at the portion where the elastic body 2 in the compressed state is disposed, together with the elastic body 2, into a gap of a robot; and an expanding step S4 of releasing the elastic body 2 from compression to expand the elastic body 2.

Figure 2:
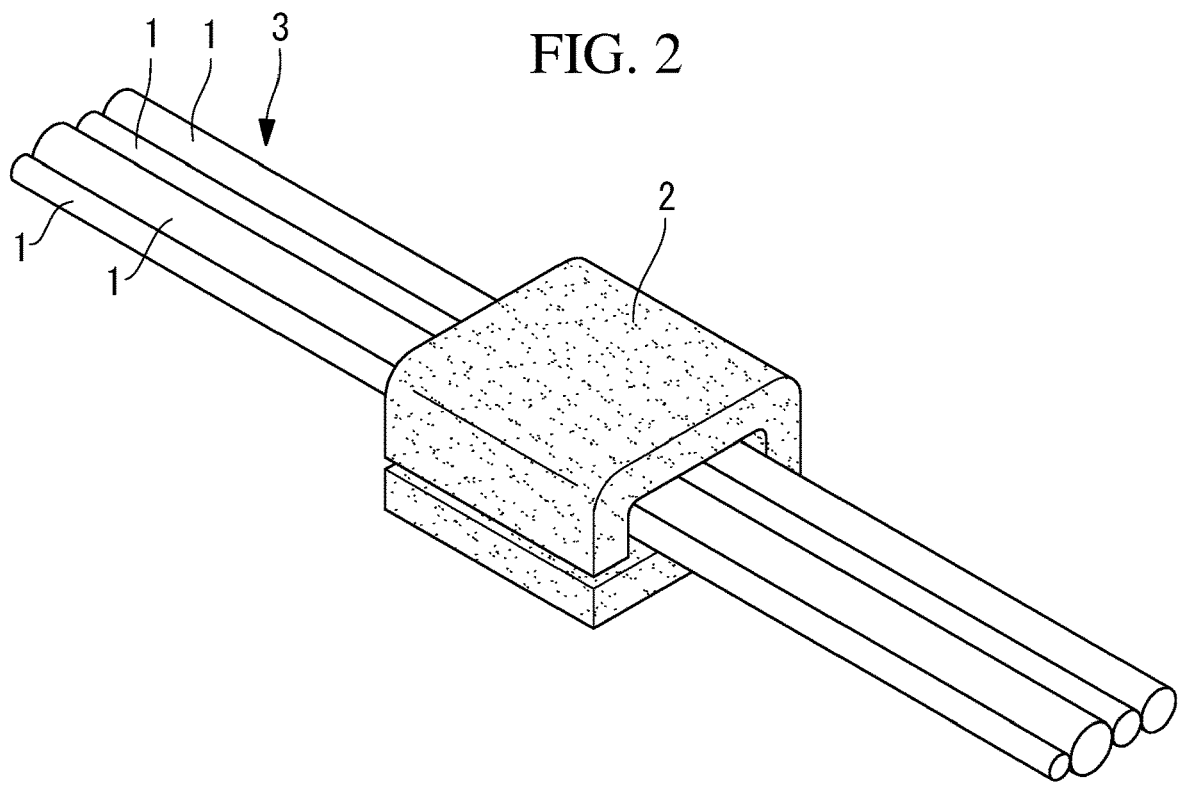
FIG. 2 is a perspective view showing a state in which an elastic body is attached to line-shaped items in a disposing step of the line-shaped-item securing method in FIG. 1.
Figure 3:
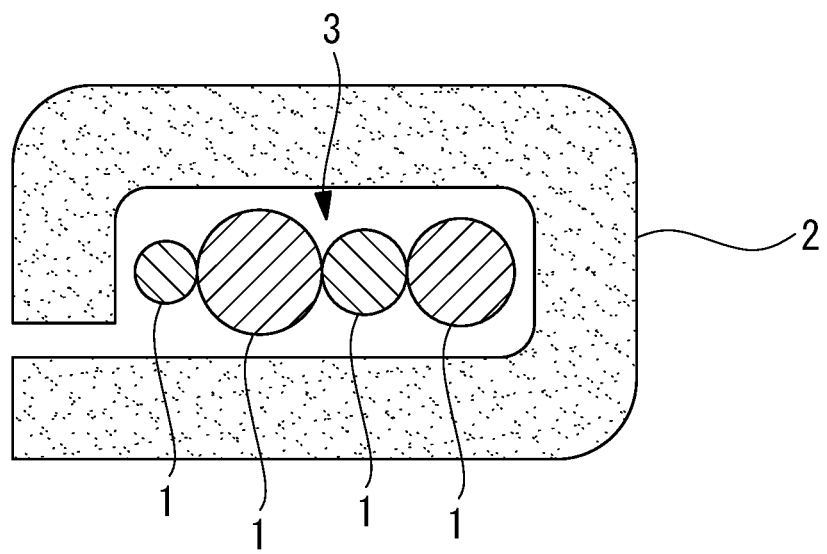
FIG. 3 is a cross-sectional view of the line-shaped items and the elastic body in FIG. 2.

As shown in FIGS. 2 and 3, in the elastic-body disposing step S1, a sheet-shaped elastic body 2 having a certain thickness dimension is wound around the periphery of a line-shaped-item bundle 3 formed by bundling a plurality of line-shaped items 1, thereby surrounding the periphery of the line-shaped items 1. An example of the elastic body 2 is a sponge made of a material having high heat resistance, such as a silicone resin or a tetrafluoroethylene resin. As for the level of heat resistance, it suffices to be able to withstand the maximum surface temperature of a motor that generates heat as the robot is driven. This prevents the elastic body 2 itself from melting even when the motor generates heat.

The thickness dimension and contraction rate of the elastic body 2 are set such that the elastic body 2, in the free state in which it is wound on the line-shaped-item bundle 3, is sufficiently larger than the width dimension of the robot gap through which the line-shaped items 1 are to be passed and such that the elastic body 2 can be compressed to a size smaller than the width dimension of the gap when it is compressed in the direction perpendicular to the lengthwise direction of the line-shaped items 1.

Examples of the robot gap include a cored hole 4 provided in a cast component constituting the robot, such as an arm or a turnable body, an open gap between two wall faces of a cast component, and a gap between a wall face of a cast component and an external face of a motor provided in the robot. Alternatively, instead of a cast component, a wall face of an extruded member or of a robot component itself manufactured by milling, a lightening hole provided in a rib joined by welding or the like in order to ensure strength of a component, or a gap between such ribs, may be utilized.

Figure 4:
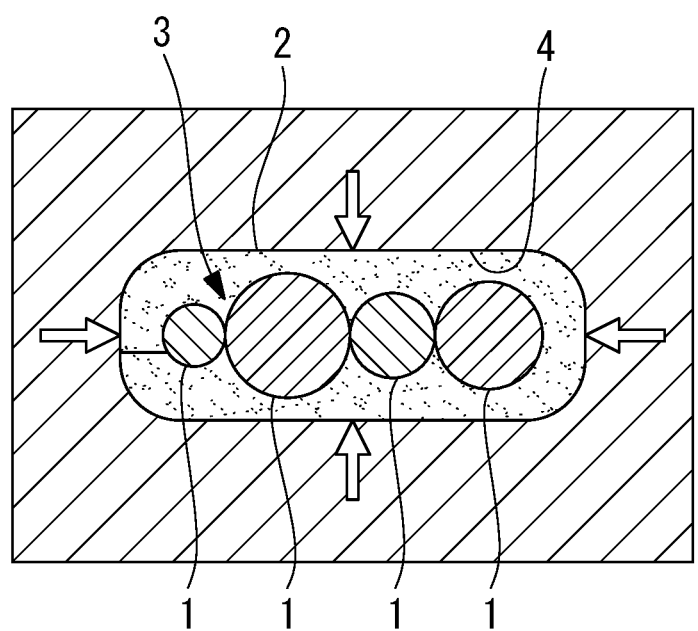
FIG. 4 is a cross-sectional view showing a state in which the elastic body in FIG. 3 is compressed in a compressing step.
Figure 5:
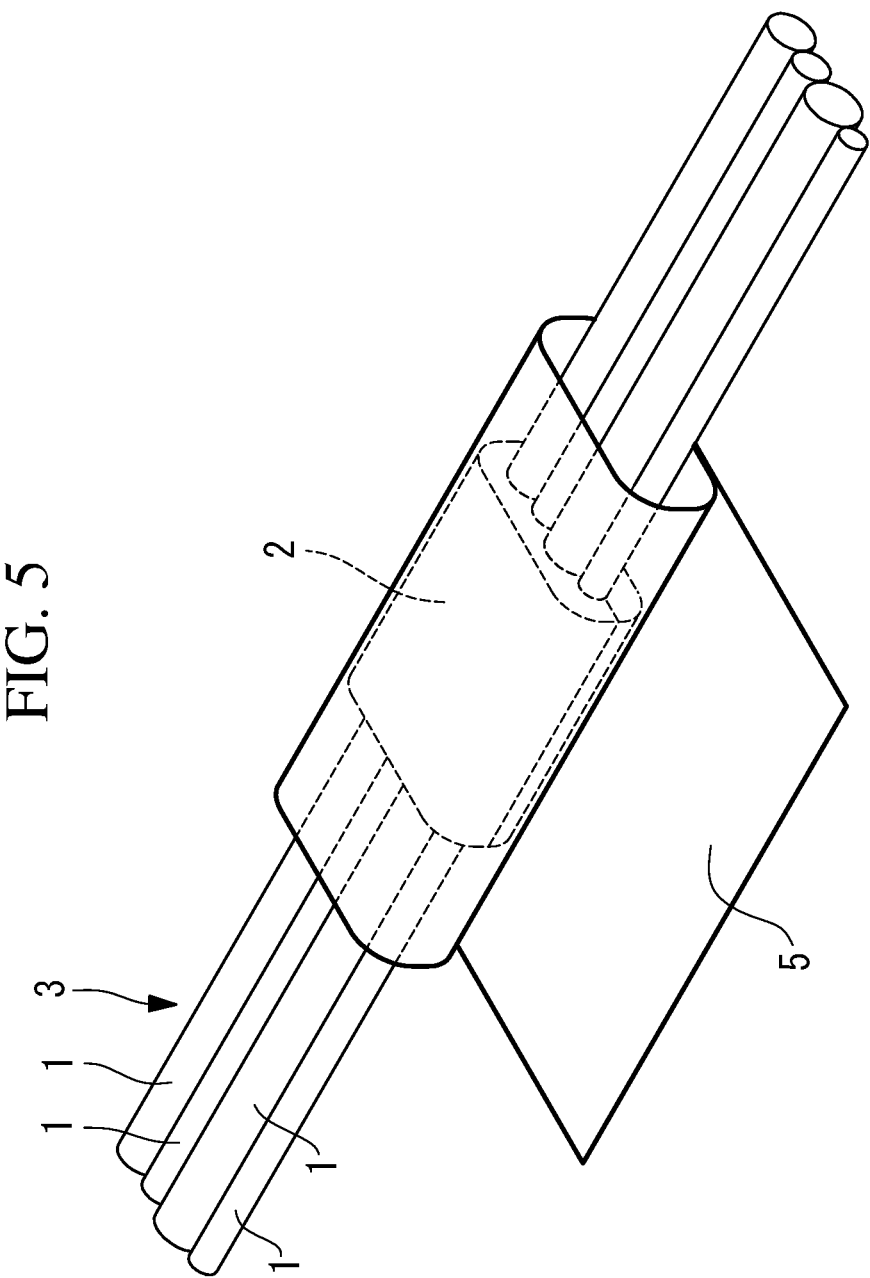
FIG. 5 is a perspective view showing a state in which the elastic body in FIG. 3 is compressed by using a sheet-shaped thin member.
Figure 6:
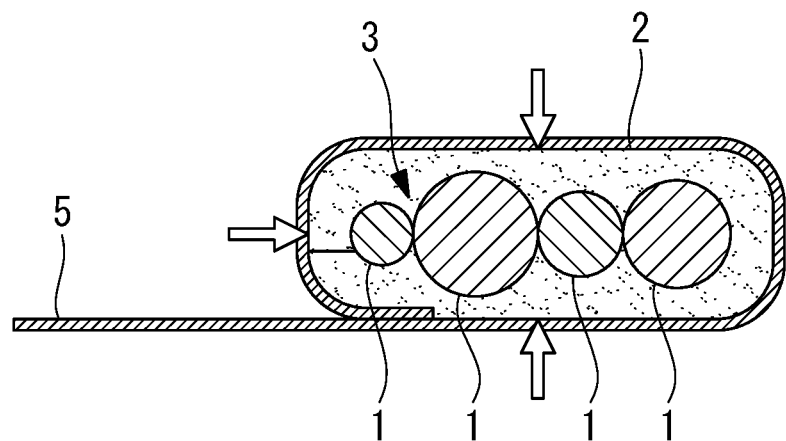
FIG. 6 is a cross-sectional view of the line-shaped items, the elastic body, and the thin member in FIG. 5.
Figure 7:
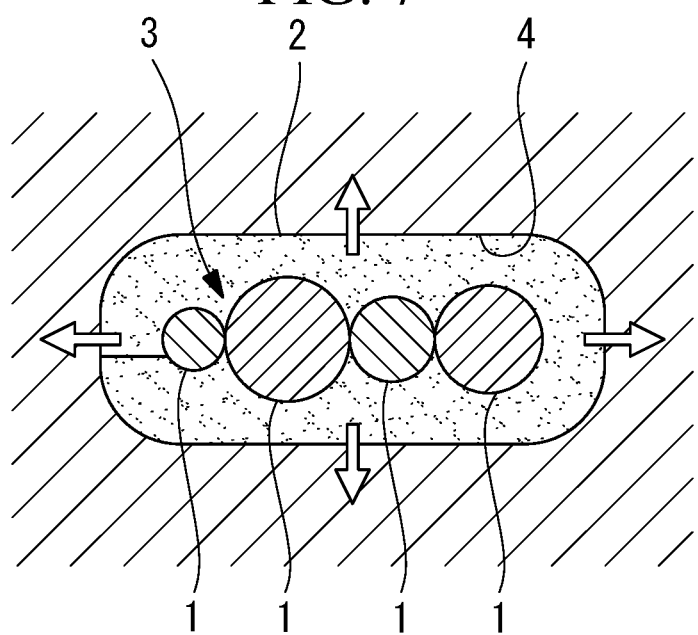
FIG. 7 is a cross-sectional view showing a state in which the elastic body in FIG. 3 is expanded in an expanding step.

For example, in the case where the cored hole 4 is utilized, in the compressing step S2, a pressure is applied to the entire periphery of the elastic body 2, wound on the line-shaped-item bundle 3, in a direction perpendicular to the lengthwise direction of the line-shaped items 1 so as to compress the elastic body 2 to a size smaller than the cored hole 4, as shown in FIG. 4. Specifically, this is possible by manually pressing the elastic body 2 so as to compress the elastic body 2, or by winding a sheet-shaped or cylinder-shaped thin member 5 having a smaller friction coefficient than the elastic body 2 around the periphery of the elastic body 2 so as to compress the elastic body 2, as shown in FIGS. 5 and 6.

In the line-shaped-item inserting step S3, the elastic body 2 compressed in the compressing step S2 is pressed into the cored hole 4. By keeping the cross-sectional face of the elastic body 2 smaller than the cored hole 4 by means of the thin member 5, the elastic body 2 can be readily inserted into the cored hole 4.

The expanding step S4 is executed almost simultaneously with the line-shaped-item inserting step S3 in the case where the elastic body 2 is manually pressed into the cored hole 4 in the line-shaped-item inserting step S3. That is, the elastic body 2 in the manually compressed state is pressed into the cored hole 4, and at the moment when the hold is released, the elastic body 2 is released from compression and is thus expanded.

Accordingly, the elastic body 2 expands to a size filling the cored hole 4, coming to press the inner face of the cored hole 4 and the external faces of the line-shaped items 1 by an elastic force thereof.

That is, after the elastic body 2 is expanded in the cored hole 4, the line-shaped items 1 are secured by a frictional force that occurs between the elastic body 2 and the inner face of the cored hole 4 and a frictional force that occurs between the elastic body 2 and the individual line-shaped items 1 so as not to move in relation to the cored hole 4.

The line-shaped-item securing method according to this embodiment will be described in the context of a more specific example.

Figure 8:
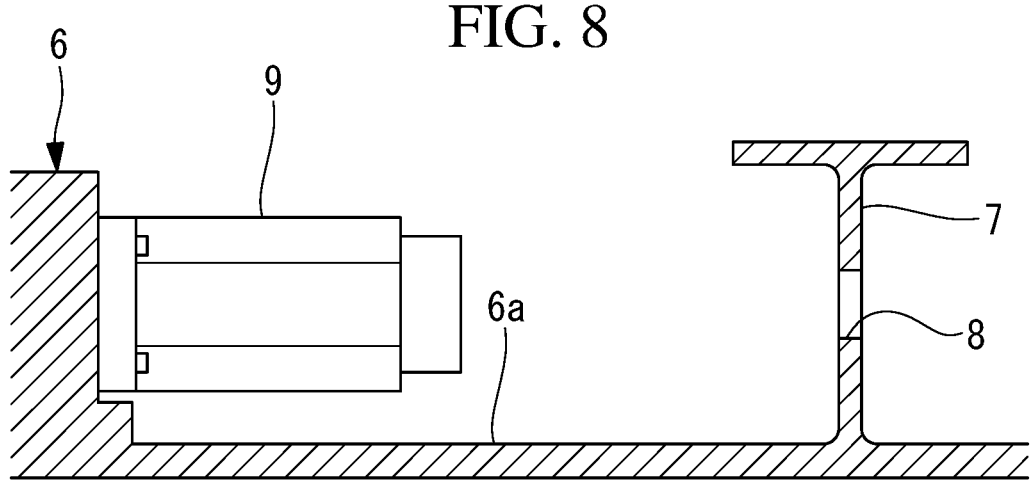
FIG. 8 is a vertical sectional view showing a portion of the robot where the line-shaped items are to be secured in the line-shaped-item securing method in FIG. 1.

FIG. 8 shows an example in which the line-shaped items 1 are secured by utilizing, as a first gap, a cored hole 8 provided in a provided in a separating wall 7 in an arm (cast component) 6 of the robot and utilizing, as a second gap, the space between a motor 9 secured inside the arm 6 of the robot and an inner wall face (wall face) 6a of the arm 6.

Figure 9:
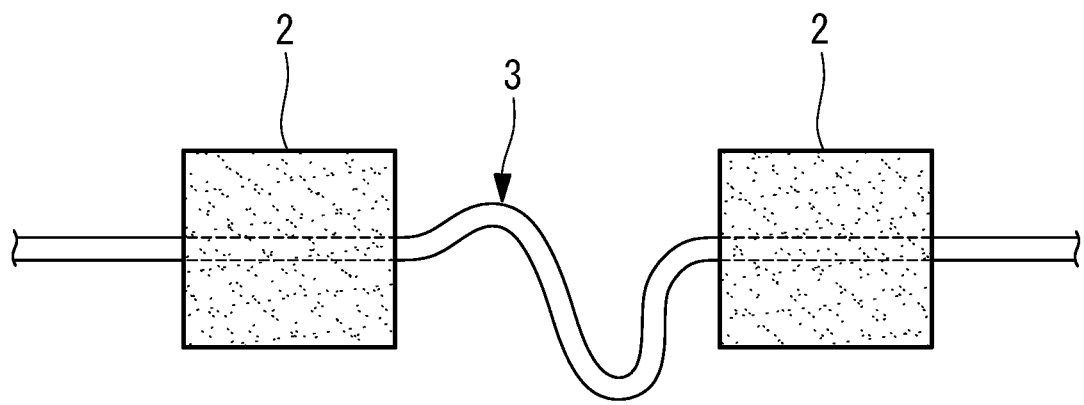
FIG. 9 is an illustration showing an example of line-shaped items and elastic bodies to be secured to the robot in FIG. 8.

In this case, as shown in FIG. 9, elastic bodies 2 are attached at two points with an interval therebetween along the lengthwise direction of the line-shaped-item bundle 3. At this time, an interval that is greater than the interval between the above-described two gaps is provided between the elastic bodies 2.

Figure 10:
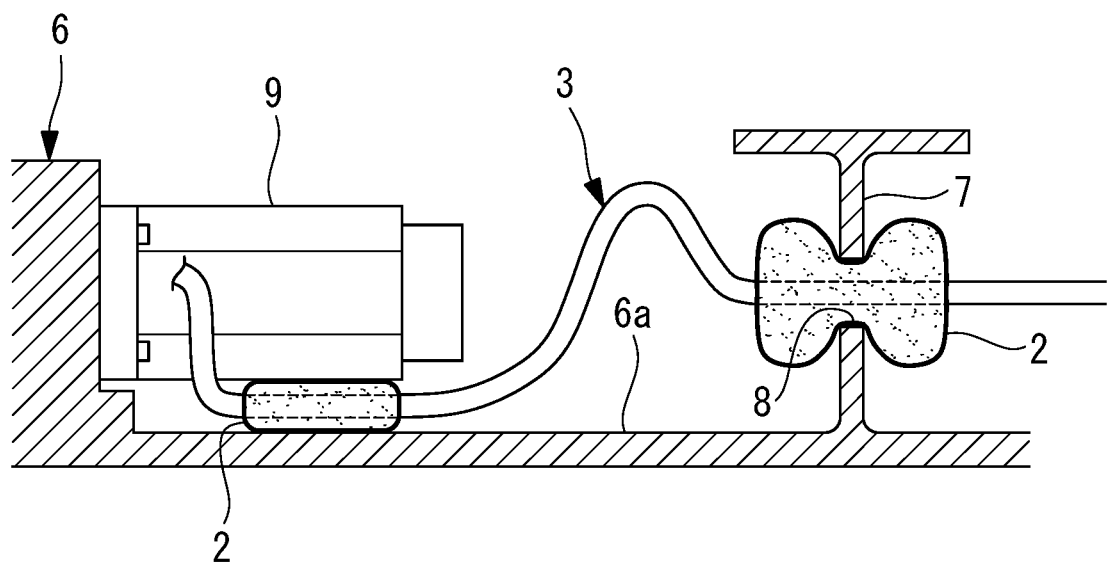
FIG. 10 is a vertical sectional view showing a state in which the line-shaped items and the elastic members in FIG. 8 are attached to the robot in FIG. 8.
Figure 11:
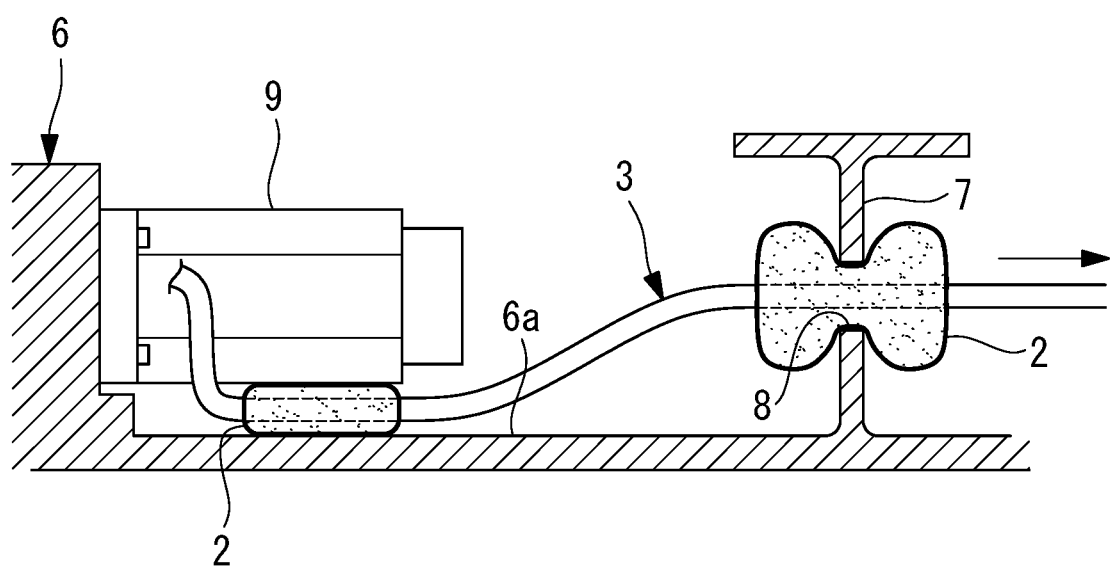
FIG. 11 is a vertical sectional view showing a state in which the length of the line-shaped items between the elastic bodies is adjusted to an appropriate length from the state in FIG. 10.

Then, as shown in FIG. 10, the respective elastic bodies 2, while being compressed, are pressed into the first gap and the second gap. By setting the interval between the elastic bodies 2 to be greater than the interval between the gaps, it is possible to ensure a degree of freedom of the cable when pressing the elastic bodies 2 into the gaps, which serves to improve the ease of work. In the state where the two elastic bodies 2 have been pressed into the respective gaps, the line-shaped-item bundle 3 between the elastic bodies 2 is relaxed. Thus, as shown in FIG. 11, the position of one of the elastic bodies 2 relative to the individual line-shaped items 1 is shifted by pulling the line-shaped-item bundle 3 along the lengthwise direction, whereby the line-shaped items 1 are wired along a suitable path, without forming any considerable slack.

Furthermore, the slacken extra length of the line-shaped-item bundle 3 shown in FIG. 9 may be folded into the inner side of one of the elastic bodies 2 and stored between the line-shaped items 1 substantially arrayed linearly and the elastic body 2, thereby absorbing the extra length.

As described above, with the line-shaped-item securing method according to this embodiment, an advantage is afforded in that it is possible to secure the line-shaped items 1 to the robot just with a simple operation of compressing and inserting the elastic body 2 wound on the line-shaped-item bundle 3 into a gap and releasing the elastic body 2 from compression to expand the elastic body 2. Thus, a base member and a clamp member, which have been necessary before, become unnecessary. Accordingly, the need for machining attachment faces for fixing the base member and the clamp member to the components of the robot, such as the arm 6 and the turnable body, is eliminated, which serves to reduce machining costs. Furthermore, the need for the work of attaching the base member and the clamp member in a narrow internal space of the arm 6 or the like is also eliminated, which results in an advantage that it is possible to considerably improve the ease of work.

Furthermore, in this embodiment, since the sheet-shaped elastic body 2 is attached to the line-shaped-item bundle 3 simply by winding the elastic body 2 around the line-shaped-item bundle 3, it is possible to directly attach the elastic body 2 to a long cable at an intermediate position along the lengthwise direction thereof. Furthermore, since the elastic body 2 is made of a heat-resistant material, even when the elastic body 2 is pressed into a gap between the motor 9 and a wall face of a component, degradation due to heat generated by the motor 9 as the robot is driven is prevented, which serves to maintain the attachment condition of the line-shaped items 1.

Figure 12:
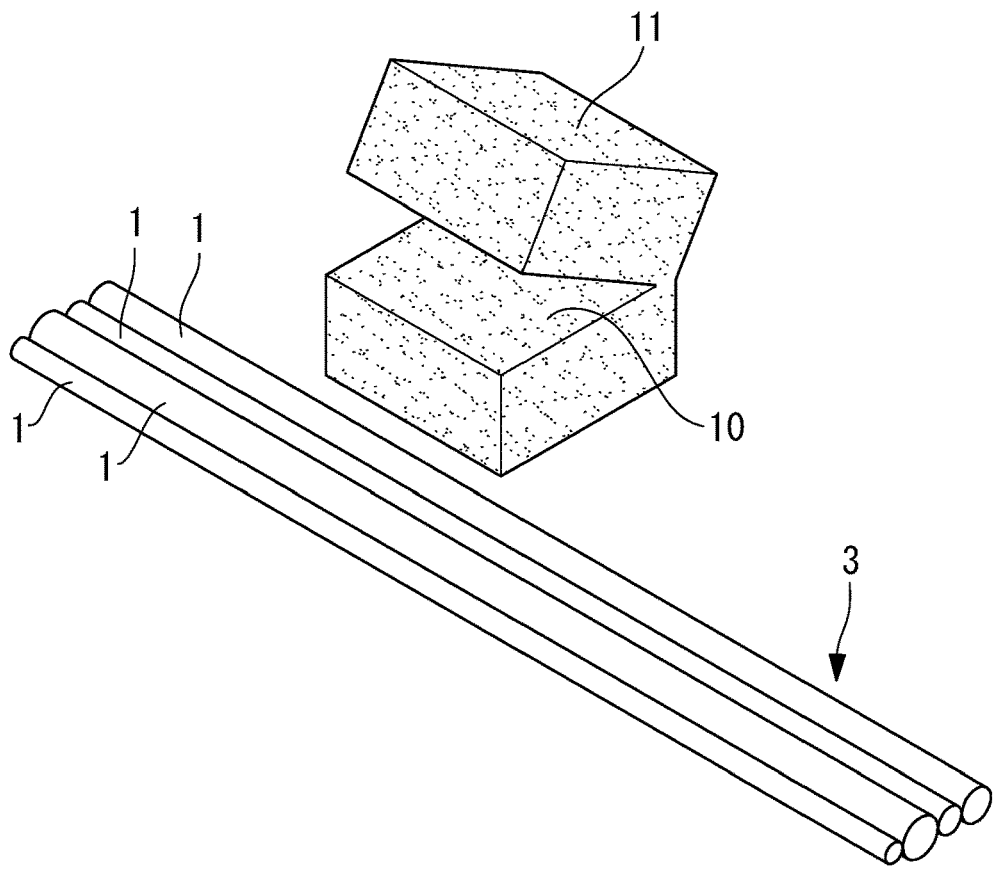
FIG. 12 is a perspective view showing a modification of the elastic body in FIG. 2.
Figure 13:
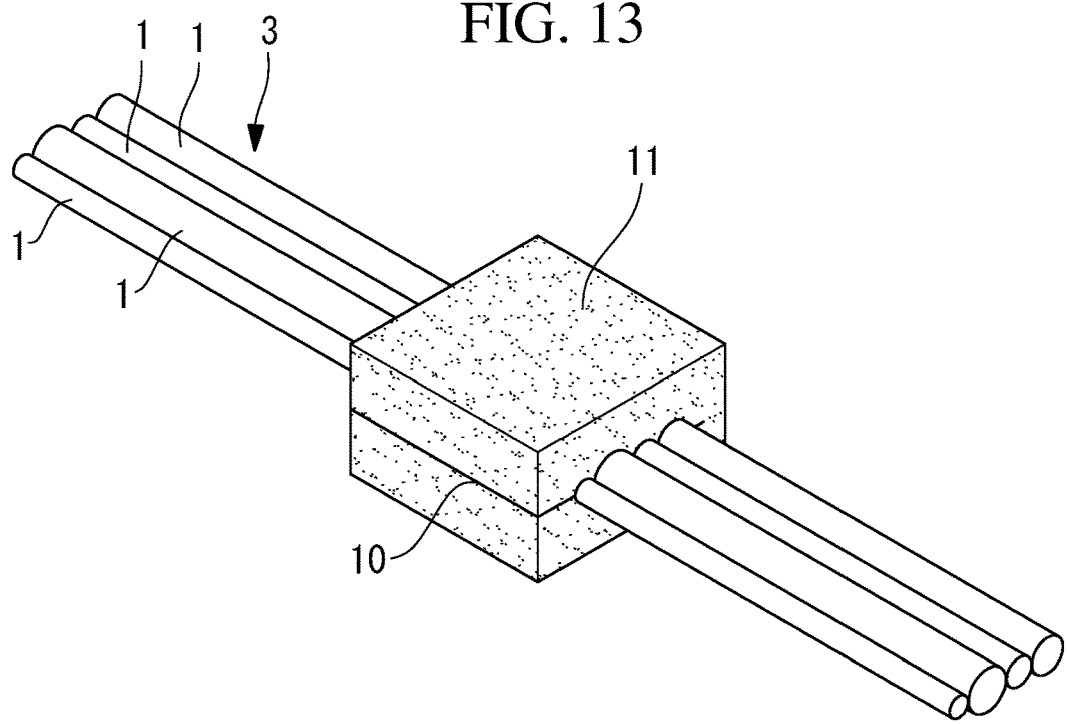
FIG. 13 is a perspective view showing a state in which the elastic body in FIG. 12 is attached to the line-shaped items.
Figure 14:
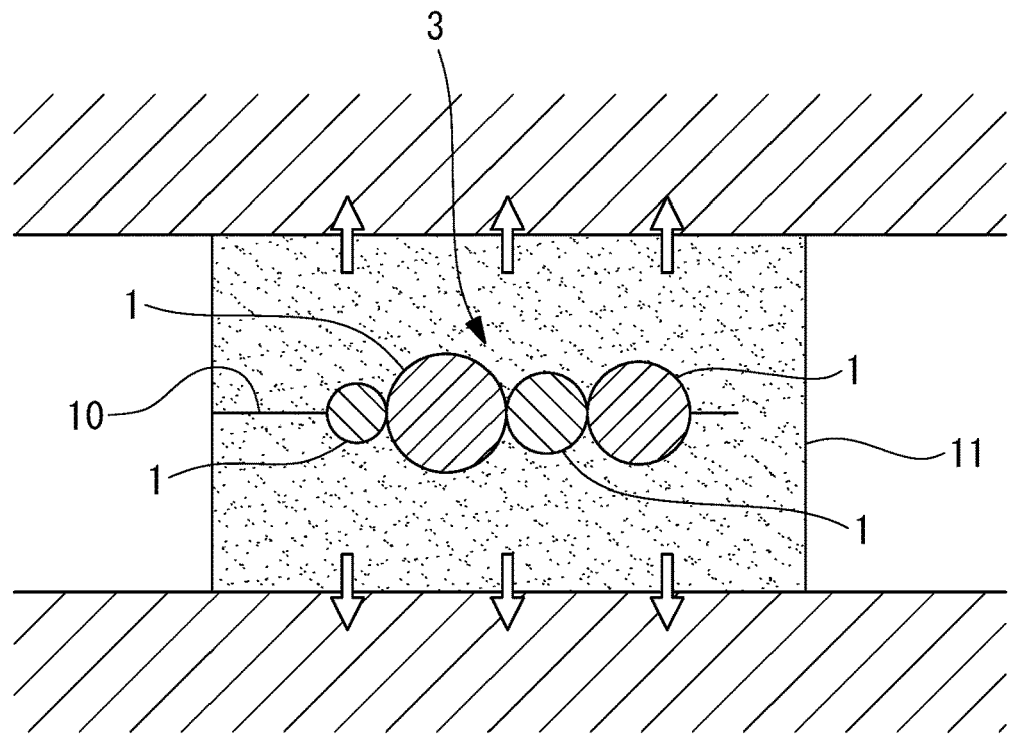
FIG. 14 is a vertical sectional view showing a state in which the elastic body in FIG. 13 is expanded in a gap.

Although the line-shaped-item securing method according to this embodiment has been described in the context of an example where the elastic body 2 is sheet-shaped, alternatively, as shown in FIG. 12, a hexahedral elastic body 11 having a slit 10 penetrating neighboring three faces thereof may be adopted. With the slit 10 opened, as shown in FIG. 12, the line-shaped-item bundle 3 is disposed in the slit 10, and the slit 10 is closed, as shown in FIG. 13, which makes it possible to readily dispose the elastic body 11 so as to surround the periphery of the line-shaped items 1. Then, as shown in FIG. 14, the elastic body 11 compressed to a size smaller than the width dimension of a gap of a robot component is pressed into a gap and is then released from compression, which makes it possible to readily secure the line-shaped-item bundle 3.

Figure 15:
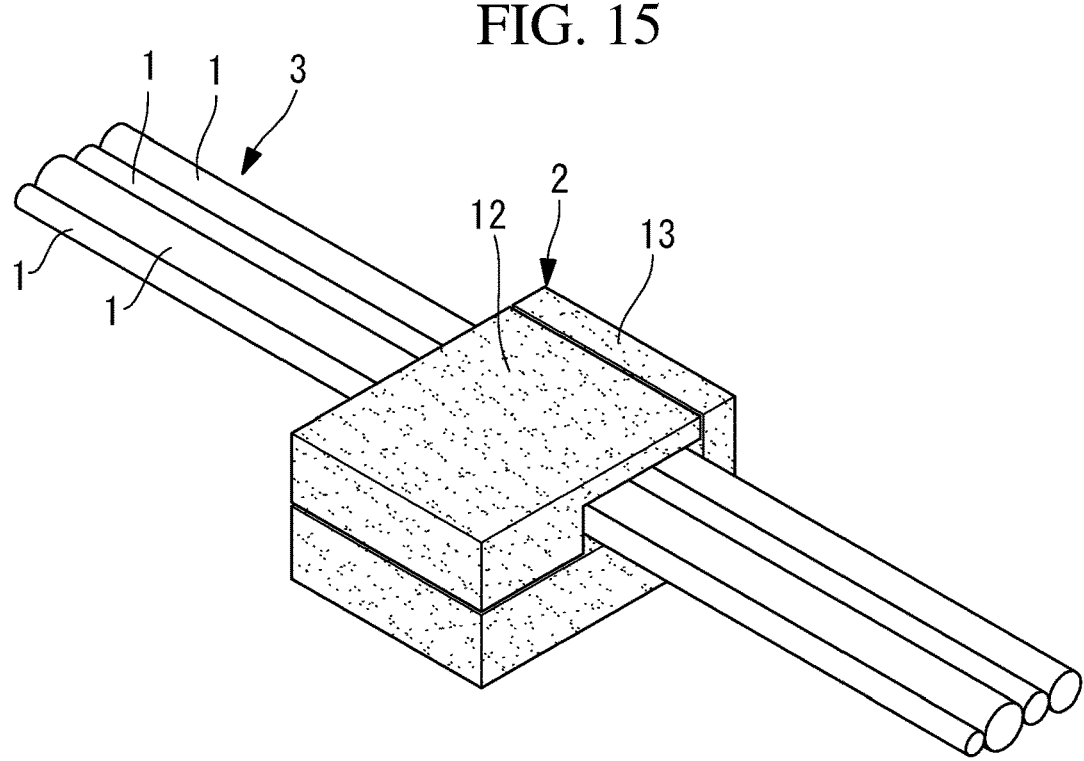
FIG. 15 is a perspective view showing another modification of the elastic body in FIG. 2.
Figure 16:
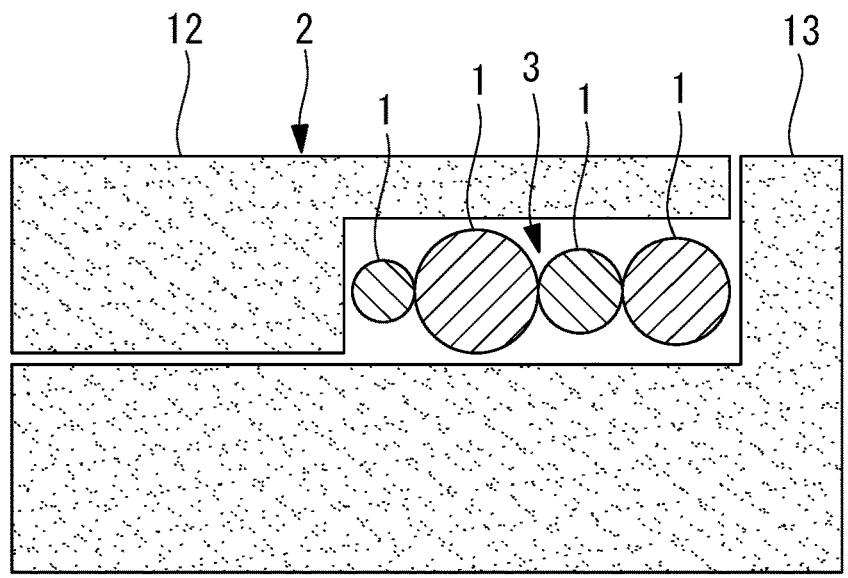
FIG. 16 is a vertical sectional view showing a state in which the elastic body in FIG. 15 is attached to the line-shaped items.
Figure 17:
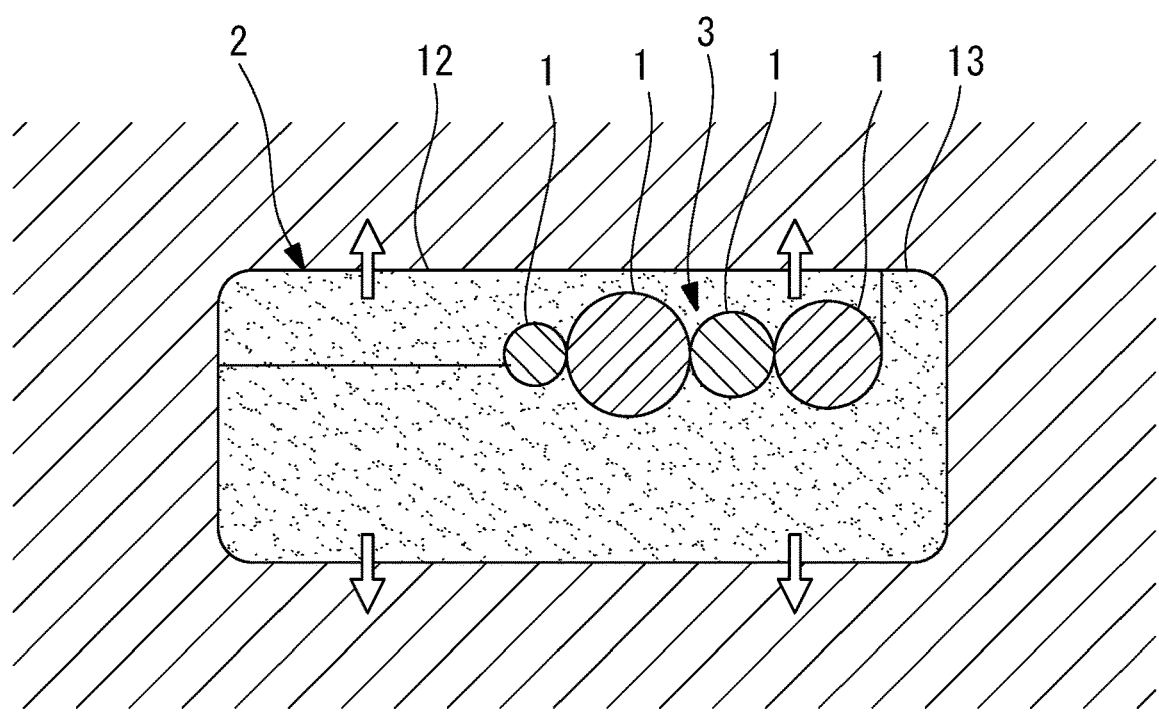
FIG. 17 is a vertical sectional view showing a state in which the elastic body in FIG. 16 is expanded in a gap.

Furthermore, the elastic body 2 is not limited to that of an integrated structure. As shown in FIGS. 15 to 17, by forming two or more elastic pieces 12 and 13 into different shapes, it is possible to secure the line-shaped items 1 to the entire elastic body 2 at a position intentionally deviated from the vicinity of the elastic body 2 in a cross section of a gap. In the case where the line-shaped-item bundle 3 is disposed in the vicinity of the center of the elastic body 2, if interference or the like occurs between an unsecured portion of the line-shaped-item bundle 3 and another member, it is possible to avoid interference by using the elastic pieces 12 and 13 mentioned above.

Figure 18:
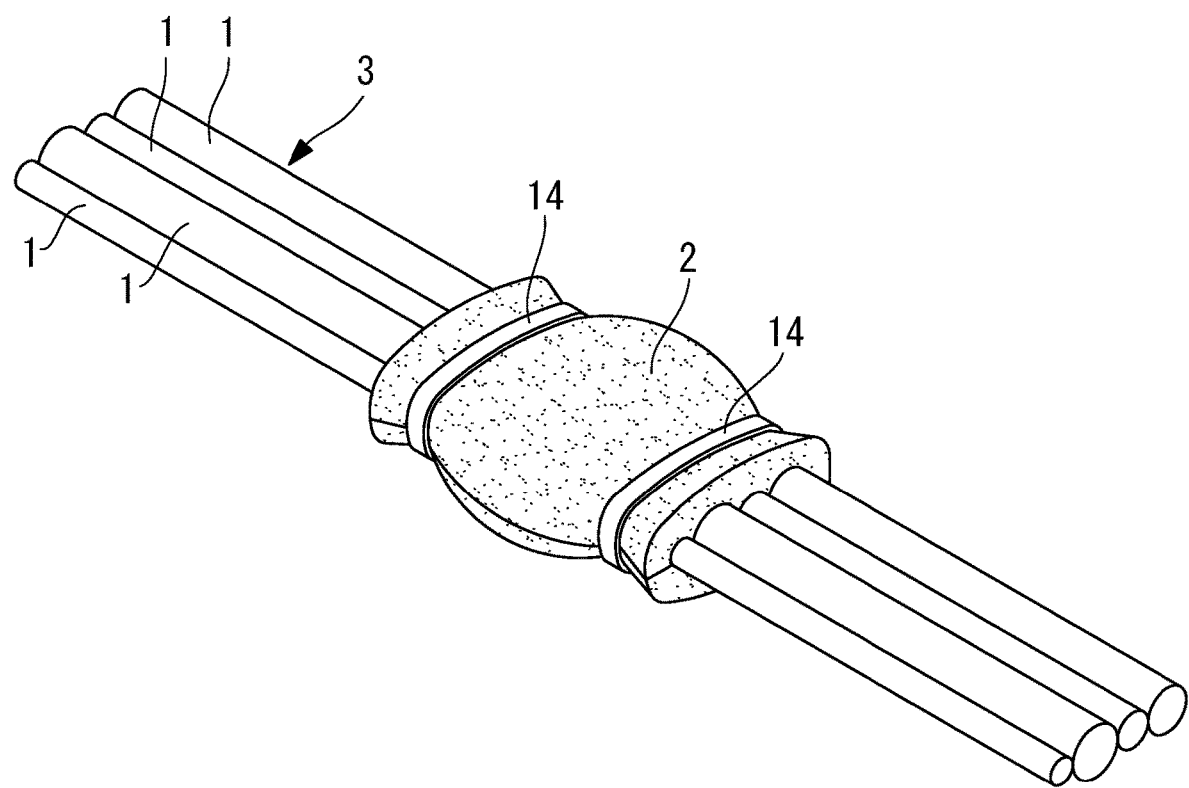
FIG. 18 is a perspective view showing a state in which the elastic body in FIG. 2 is lashed by using binding bands.

Furthermore, in order to maintain the attachment condition of the elastic body 2 to the line-shaped-item bundle 3, for example, as shown in FIG. 18, the elastic body 2 may be lashed by using a lashing tool, such as a binding band (lashing member) 14. In the example shown in FIG. 18, both ends of the elastic body 2 along the lengthwise direction thereof are lashed by using banding bands 14. Thus, the elastic body 2 is maintained in the state attached to the line-shaped-item bundle 3. Furthermore, when the elastic body 2 is inserted into the cored hole 4, etc. of the robot along the lengthwise direction thereof, it is possible to insert the elastic body 2 into the cored hole 4 from an end of the elastic body 2 compressed by the binding bands 14, which results in an advantage that the work of insertion is facilitated. The lashing tool is cut after the elastic body 2 is inserted into the gap, whereby the elastic body 2 is released from compression, which serves to further enhance the securing force. Alternatively, the lashing tool may be maintained as is instead of being cut.

Figure 19:
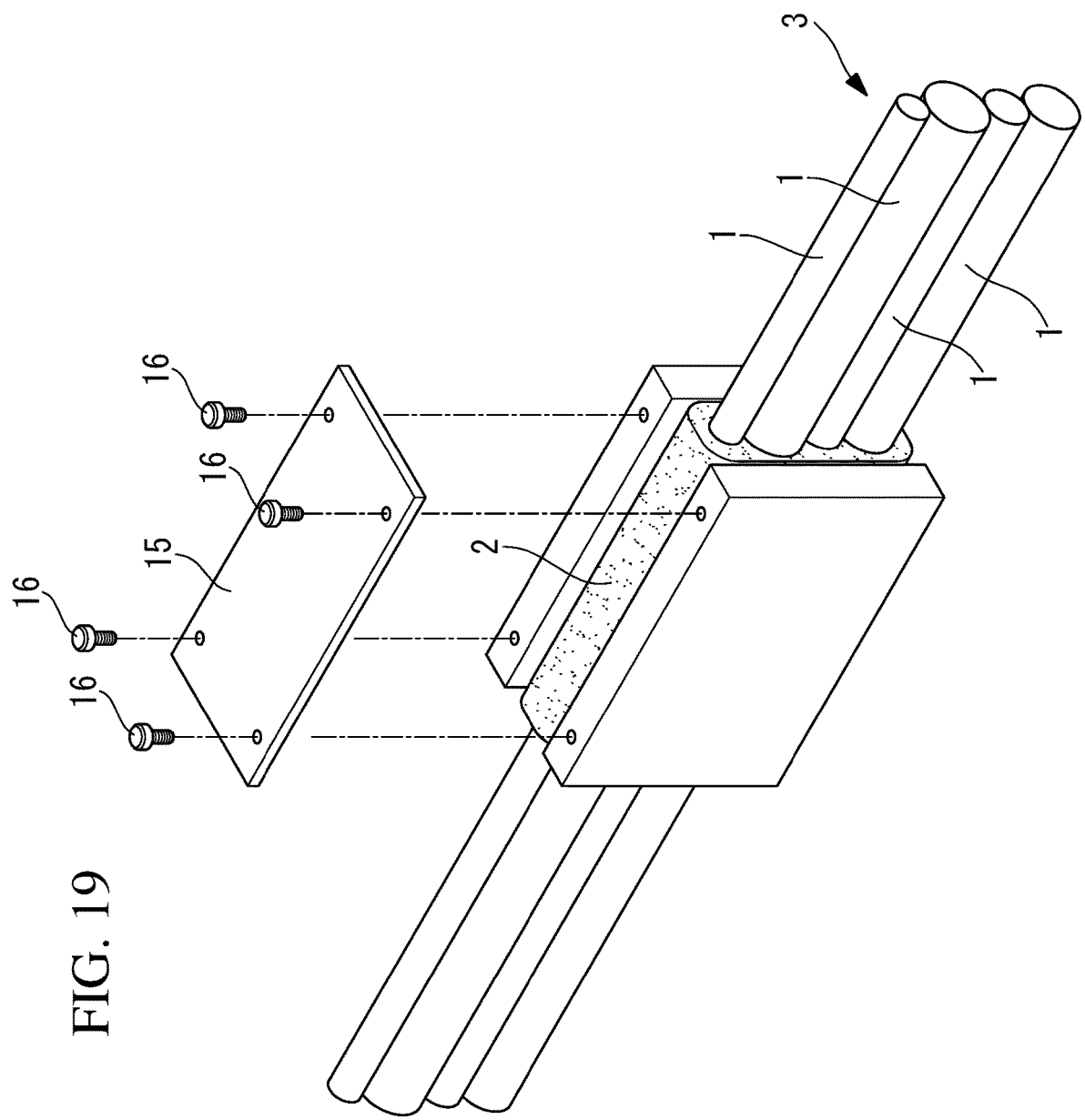
FIG. 19 is a perspective view showing another modification of the elastic body in FIG. 2.

Furthermore, this embodiment may include a covering step of providing a cover member 15 at least partially on the outer circumferential face of the elastic body 2, opened to the outside, in the case where the elastic body 2 is inserted into an open gap between two wall faces of a cast component, a gap between a wall face of a cast component and an external face of a motor provided in a robot, or the like and a portion of the inserted elastic body 2 is opened to the outside. Alternatively, as shown in FIG. 19, a cover member 15 may be provided on a structure forming a gap into which the elastic body 2 is inserted (e.g., a wall face of a cast component or an external face of a motor). This makes it possible to hide the elastic body 2 such that the elastic body 2 is not directly visible from the outside. In particular, in the upper arm section of the arm 6 of the robot, where the line-shaped items 1 often become exposed, it is possible to improve the external appearance.

Furthermore, for the purpose of attachment of the cover member 15, as shown in FIG. 19, it is possible to employ a fastening means using screws 16, bonding may be perform by using an adhesive, or other kinds of means may be employed for fixing.

As a result, the above-described embodiment leads to the following aspect.

The present invention, in one aspect thereof, provides a line-shaped-item securing method including an elastic-body disposing step of disposing an elastic body so as to surround the periphery of one or more line-shaped items; a compressing step of compressing the elastic body, disposed around the periphery of the line-shaped items in the elastic-body disposing step, in a direction perpendicular to the lengthwise direction of the line-shaped items to dimensions smaller than a gap in a robot, through which the line-shaped items are to be passed; a line-shaped-item inserting step of inserting a portion of the line-shaped items, surrounded by the elastic body compressed in the compressing step, into the gap; and an expanding step of releasing the elastic body from compression, with the line-shaped items inserted into the gap in the line-shaped-item inserting step, thereby expanding the elastic body.

According to this aspect, an elastic body is disposed so as to surround a portion, along the lengthwise direction, of the periphery of line-shaped items, the elastic body is compressed in a direction perpendicular to the lengthwise direction of the line-shaped items to dimensions smaller than a gap of a robot, through which the line-shaped items are to be passed, the portion of the line-shaped items surrounded by the compressed elastic body is inserted into the gap, and then the elastic body is released from compression and is thereby expanded, whereby the elastic body expands so as to fill the gap, coming into tight contact with both the surface of the robot and the line-shaped items. This makes it possible to secure and immobilize the line-shaped items in the gap of the robot with the friction between the surface of the robot and the elastic body and with friction between the elastic body and the line-shaped items.

That is, a base member and a clamp member, which have hitherto been necessary, become unnecessary in order to secure line-shaped items to a robot. This eliminates the need for machining for the attachment surface or screws for attaching a base member and allows line-shaped items to be secured in a narrow internal space of a component constituting the robot. Furthermore, the need for the work of fixing a base member and a clamp member is eliminated, which facilitates the work of securing line-shaped items.

In the above aspect, the gap may be a cored hole of a cast component constituting the robot.

In this case, since a cored hole of a cast component is not deformed even if a large force is applied thereto, it is possible to compress the elastic member with a high compression force to generate a large frictional force, which makes it possible to secure and immobilize the line-shaped items more reliably. A cored hole is usually formed inside a cast component, and line-shaped items are often passed therethrough. By sandwiching the elastic body between the line-shaped items and the casting surface, the line-shaped items are prevented from coming into contact with the casting surface, which makes it possible to maintain the line-shaped items in sound conditions.

Alternatively, in the above aspect, the gap may be formed between at least two wall faces of a cast component constituting the robot.

In this case, since two wall faces of a cast component are not deformed even if a large force is applied thereto, it is possible to compress the elastic member with a high compression force to generate a large frictional force, which makes it possible to secure and immobilize the line-shaped items more reliably. The wall faces of the cast component may be either inner wall faces or outer wall faces.

Alternatively, in the above aspect, the gap may be formed between a wall face of a cast component constituting the robot and a motor included in the robot.

In this case, by utilizing a gap formed between the outer surface of a motor firmly fixed to a cast component and a cast component constituting a robot, the elastic body is compressed with a high compression force to generate a large frictional force, which makes it possible to secure and immobilize the line-shaped items more reliably. The wall faces of the cast component may be either inner wall faces or outer wall faces.

Furthermore, in the above aspect, the elastic body may have a level of heat resistance sufficient to withstand the maximum surface temperature of the motor.

In this case, the elastic body itself is prevented from melting even if the motor generates heat as the robot is driven, whereby the elasticity is maintained, which makes it possible to maintain the line-shaped items in a state secured to the robot.

Furthermore, in the above aspect, the elastic body may be formed in the shape of a sheet wound around the periphery of the line-shaped items.

In this case, it is possible to dispose a sheet-shaped elastic body so as to surround the periphery of the line-shaped items just by winding the elastic body at an intermediate position, along the lengthwise direction, of the line-shaped items.

Furthermore, in the above aspect, the elastic body may include a slit, and in the elastic-body disposing step, the slit may be opened, and the line-shaped items may be disposed in the slit.

In this case, it is possible to dispose the elastic body at an intermediate position, along the lengthwise direction, of the line-shaped items so as to surround the periphery of the line-shaped items by opening the slit of the elastic body, disposing the intermediate position, along the lengthwise direction, of the line-shaped items in the slit, and then closing the slit.

Alternatively, in the above aspect, the elastic body may include two or more elastic pieces that are joined together from the outward in the radial direction of the line-shaped items.

In this case, it is possible to dispose the elastic body at an intermediate position, along the lengthwise direction, of the line-shaped items so as to surround the periphery of the line-shaped items by joining two or more elastic pieces together at the intermediate position, along the lengthwise direction, of the line-shaped items from the outward in the radial direction.

Furthermore, in the above aspect, the elastic-body disposing step may include a step of lashing, by using a lashing member, the elastic body disposed so as to surround the periphery of the line-shaped items.

In this case, the elastic body disposed so as to surround the periphery of the line-shaped items is lashed by the lasing member, which prevents the elastic body from falling off the line-shaped items. This serves to improve the ease of the work of securing cables.

Furthermore, in the above aspect, the compressing step may include a step of covering the compressed elastic body with a sheet-shaped or cylinder-shaped thin member made of a material having a smaller frictional coefficient than the elastic body, in the line-shaped-item inserting step, a portion of the line-shaped items, surrounded by the elastic body covered with the thin member, may be inserted into the gap, and the expanding step may include a step of extracting the thin member from the gap.

In this case, when the elastic body disposed so as to surround the periphery of the line-shaped items is inserted into the gap, the elastic body is temporarily maintained in a compressed state by the sheet-shaped or cylinder-shaped thin member. This serves to facilitate the insertion of the robot into the gap, which serves to improve the ease of work. After the insertion, it is possible to extract the thin member with little frictional force from between the robot and the elastic body, which makes it possible to immediately release the elastic body from compression, thereby securing the elastic body in the gap of the robot.

According to the present invention, an advantage is afforded in that it is possible to secure line-shaped items to an arm or a turnable body of an industrial robot without having to use a base member or a clamp member.

REFERENCE SIGNS LIST

1 Line-shaped item
2, 11 Elastic body
4, 8 Cored hole
Thin 5 member
6 Arm (cast component)
6a Inner wall face (wall face)
9 Motor
10 Slit
12, 13 Elastic piece
14 Binding band (lashing member)
S1 Elastic-body disposing step
S2 Compressing step
S3 Line-shaped-item inserting step
S4 Expanding step

The invention claimed is:

1. A line-shaped-item securing method, comprising:
   an elastic-body disposing step of disposing an elastic body so as to surround a periphery of one or more line-shaped items;
   a compressing step of compressing the elastic body, disposed around the periphery of the line-shaped items in the elastic-body disposing step, in a direction perpendicular to a lengthwise direction of the line-shaped items to dimensions smaller than a gap in a robot, through which the line-shaped items are to be passed;
   a line-shaped-item inserting step of inserting a portion of the line-shaped items, surrounded by the elastic body compressed in the compressing step, into the gap; and
   an expanding step of releasing the elastic body from compression, with the line-shaped items inserted into the gap in the line-shaped-item inserting step, thereby expanding the elastic body.

2. The line-shaped-item securing method according to claim 1, wherein the gap is a cored hole of a cast component constituting the robot.

3. The line-shaped-item securing method according to claim 1, wherein the gap is formed between at least two wall faces of a cast component constituting the robot.

4. The line-shaped-item securing method according to claim 1, wherein the gap is formed between a wall face of a cast component constituting the robot and a motor included in the robot.

5. The line-shaped-item securing method according to claim 4, wherein the elastic body has a level of heat resistance sufficient to withstand the maximum surface temperature of the motor.

6. The line-shaped-item securing method according to claim 1, wherein the elastic body is formed in a shape of a sheet wound around the periphery of the line-shaped items.

7. The line-shaped-item securing method according to claim 1,
   wherein the elastic body includes a slit, and
   wherein, in the elastic-body disposing step, the slit is opened, and the line-shaped items are disposed in the slit.

8. The line-shaped-item securing method according to claim 1, wherein the elastic body includes two or more elastic pieces that are joined together from outward in a radial direction of the line-shaped items.

9. The line-shaped-item securing method according to claim 1, wherein the elastic-body disposing step includes a step of lashing, by using a lashing member, the elastic body disposed so as to surround the periphery of the line-shaped items.

10. The line-shaped-item securing method according to claim 1,
   wherein the compressing step includes a step of covering the compressed elastic body with a sheet-shaped or cylinder-shaped thin member made of a material having a smaller frictional coefficient than the elastic body,
   wherein, in the line-shaped-item inserting step, a portion of the line-shaped items, surrounded by the elastic body covered with the thin member, is inserted into the gap, and
   wherein the expanding step includes a step of extracting the thin member from the gap.

* * * * *